(12) United States Patent
Wang et al.

(10) Patent No.: US 11,808,693 B2
(45) Date of Patent: Nov. 7, 2023

(54) APPARATUS FOR MEASURING PEEL STRENGTH OF BATTERY PART USING ELECTROMAGNET AND PEEL STRENGTH MEASUREMENT METHOD USING THE SAME

(71) Applicant: LG CHEM, LTD., Seoul (KR)

(72) Inventors: Yeon Kyong Wang, Daejeon (KR); Chan Woo Park, Daejeon (KR); Jin Seop Kwak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 705 days.

(21) Appl. No.: 16/959,664

(22) PCT Filed: Jul. 23, 2019

(86) PCT No.: PCT/KR2019/009111
§ 371 (c)(1),
(2) Date: Jul. 1, 2020

(87) PCT Pub. No.: WO2020/085619
PCT Pub. Date: Apr. 30, 2020

(65) Prior Publication Data
US 2021/0080377 A1  Mar. 18, 2021

(30) Foreign Application Priority Data
Oct. 26, 2018 (KR) .......... 10-2018-0128606

(51) Int. Cl.
*G01N 19/04* (2006.01)
*G01N 3/08* (2006.01)

(52) U.S. Cl.
CPC .......... *G01N 19/04* (2013.01); *G01N 3/08* (2013.01); *G01N 2203/005* (2013.01);
(Continued)

(58) Field of Classification Search
CPC .. G01N 19/04; G01N 3/08; G01N 2203/0014; G01N 2203/0091; G01N 2203/02; G01N 2203/005; Y02E 60/10
See application file for complete search history.

(56) References Cited

U.S. PATENT DOCUMENTS

| | | | |
|---|---|---|---|
| 4,194,392 A | 3/1980 | Lombard et al. | |
| 2014/0216148 A1 | 8/2014 | Sitterlet | |
| 2015/0276579 A1 | 10/2015 | Jeong et al. | |

FOREIGN PATENT DOCUMENTS

| | | |
|---|---|---|
| CN | 203385648 U | 1/2014 |
| CN | 207816748 U | 9/2018 |

(Continued)

OTHER PUBLICATIONS

International Search Report (with partial translation) and Written Opinion issued in corresponding International Patent Application No. PCT/KR2019/009111, dated Oct. 28, 2019.

(Continued)

*Primary Examiner* — Jonathan M Dunlap
(74) *Attorney, Agent, or Firm* — Morgan, Lewis & Bockius LLP (57) ABSTRACT

Disclosed is a peel strength measurement apparatus using an electromagnet, the peel strength measurement apparatus including a test piece fixing unit configured to fix a test piece including at least two layers, a magnetic material attached to at least one surface of the test piece, an electromagnet configured to apply magnetic force to the magnetic material, a power supply unit configured to supply electric power to the electromagnet such that the electromagnet can generate a magnetic field, and a current controller configured to control the supply of electric power from the power supply unit to the electromagnet.

9 Claims, 6 Drawing Sheets

(52) U.S. Cl.
CPC ............... *G01N 2203/0014* (2013.01); *G01N 2203/0091* (2013.01); *G01N 2203/02* (2013.01); *Y02E 60/10* (2013.01)

(56) References Cited

FOREIGN PATENT DOCUMENTS

| JP | 108-16648 B2 | 2/1996 |
|---|---|---|
| JP | H11-112139 A | 4/1999 |
| JP | 2009-156680 A | 7/2009 |
| JP | 2017-198518 A | 11/2017 |
| KR | 10-1998-0051150 A | 9/1998 |
| KR | 10-0832851 B1 | 5/2008 |
| KR | 10-0901982 B1 | 6/2009 |
| KR | 10-1007997 B1 | 1/2011 |
| KR | 10-2011-0084723 A | 7/2011 |
| KR | 10-2012-0097179 A | 9/2012 |
| KR | 10-1258073 B1 | 4/2013 |
| KR | 10-2013-0076950 A | 7/2013 |
| KR | 10-2015-0053582 A | 5/2015 |
| KR | 10-2018-0006780 A | 1/2018 |
| WO | 2012053286 A1 | 4/2012 |

OTHER PUBLICATIONS

Extended European Search Report issued by the European Patent Office dated Nov. 17, 2020 in corresponding European patent application No. 19876782.4.
European Office Action issued in corresponding EP Application No. 19 876 782.4 dated Mar. 23, 2023.
Ostrowicki, et al., "Magnetically actuated peel test for thin films," Thin Solid Films, vol. 520, No. 11, 2012, pp. 3987-3993.

APPARATUS FOR MEASURING PEEL STRENGTH OF BATTERY PART USING ELECTROMAGNET AND PEEL STRENGTH MEASUREMENT METHOD USING THE SAME

TECHNICAL FIELD

This application claims the benefit of priority to Korean Patent Application No. 2018-0128606 filed on Oct. 26, 2018, the disclosure of which is hereby incorporated by reference herein in its entirety.

The present invention relates to an apparatus for measuring the peel strength of a battery part using an electromagnet and a method of measuring the peel strength of the battery part using the same, and more particularly to an apparatus capable of adjusting the intensity of current applied to an electromagnet in order to measure the peel strength of the edge of the end portion of a battery part including a plurality of layers and a method of measuring the peel strength of the edge of the end portion of the battery part using the same.

BACKGROUND ART

A great number of electronic parts are manufactured by stacking a plurality of thin layers and then fixing or adhering the same. An ITO film may be attached to the top of a glass substrate used in a display, and a decorative film may be attached to a window in order to realize a design having a special pattern.

For an electronic part including a plurality of layers, problems related to guarantee of performance and durability occur in the case in which the force of adhesion between the respective layers is low. In the case in which the adhesive force of a stacked type electrode assembly, which is configured to have a structure in which positive electrodes and negative electrodes are sequentially stacked in the state in which a separator is interposed between each of the positive electrodes and a corresponding one of the negative electrodes, is low, external appearance defect or short circuit may occur. When the electrode assembly is impregnated with an electrolytic solution, a tape may be detached from the electrode assembly, whereby the stacked structure of the electrode assembly may be deformed. In order to improve safety and performance of a product, an apparatus and method capable of accurately measuring peel strength between the respective layers are needed.

A pull test, a peel test, and a crack growth method through four point bending are used as methods of measuring force of adhesion between the respective layers. In the pull test, a stud having a predetermined area is fixed to the surface of a thin film using an adhesive, and the stud is pulled perpendicularly in order to measure interfacial adhesive force. In the peel test, a thin film is peeled using an adhesive tape, or a thin film partially peeled from a substrate is pulled in order to measure interfacial adhesive force while separating the interface thereof, which is a method of directly applying a separation load to the interface thereof. In the crack growth method through four point bending, cracks are formed in a thin film, and then the cracks are stably grown through four point bending, and it is possible to measure interfacial adhesive force using growth characteristics of the cracks.

However, the above methods have problems in that interfacial peeling is not caused in the case in which the rigidity of the thin film is not sufficiently secured or the thin film is flexible and in that accuracy and repetitiveness of the conventional adhesive force measurement methods are not high.

A tape adhesive force measurement apparatus according to Patent Document 1 (Korean Patent Application Publication No. 2011-0084723 (2011 Jul. 26); hereinafter referred to as Patent Document 1) is configured to forcibly induce a peeling phenomenon from a test tape of a thin film adhered to a test plate in the state of being stacked thereon in order to measure adhesive force or peeling force, wherein the test tape must be pulled perpendicularly in order to continuously remove the test tape from the test plate. At this time, in the case in which the strength of the thin test tape is not sufficient, there is a high possibility of a griping area of the test tape being torn or deformed even before an interfacial peeling phenomenon occurs. In order to accurately measure interfacial peel strength, tests must be repeatedly performed. In addition, the above apparatus and method have a limitation in that only the peeling force of the middle portion of a surface to be measured is measured.

Patent Document 2 (Korean Registered Patent Publication No. 1258073 (2013 Apr. 19); hereinafter referred to as Patent Document 2) provides an interfacial separation apparatus through substrate crack inducement configured such that, in a test sample formed to have a shape in which a thin film is deposited on the top of a substrate, cracks are formed in the substrate, one side of the cracked substrate is fixed to a stationary end so as to be parallel thereto, the other side of the cracked substrate is fixed to a moving end so as to be parallel thereto, and interfacial adhesive force between the thin film and the substrate is measured using a load value measured by a load cell when the moving end is moved in a vertical direction and a vertical transfer displacement value measured by a displacement measurement means.

The above apparatus is applicable to a structure in which a soft thin film and a hard substrate are combined. Since the hard substrate must be cracked, however, there is a problem in that the substrate is damaged.

In general, the portion of a product that becomes defective first due to peeling is the edge of the end portion of the product, which is the weakest. In the conventional apparatus, the end portions of a sample and the measurement apparatus must be fixed for measurement, and therefore there is still a structural limitation in that it is not possible to provide adhesive force at the edge of the end portion of the product, which is the most important in actual product design.

DISCLOSURE

Technical Problem

The present invention has been made in view of the above problems, and it is an object of the present invention to provide a peel strength measurement apparatus capable of directly applying a load to a portion at which the measurement of peel strength is desired, whereby it is possible to measure peel strength at any desired position, and a peel strength measurement method using the same.

Technical Solution

A peel strength measurement apparatus using an electromagnet according to an embodiment of the present invention provided to accomplish the above object may include a test piece fixing unit configured to fix a test piece including at least two layers, a magnetic material attached to at least one surface of the test piece, an electromagnet configured to apply magnetic force to the magnetic material, a power supply unit configured to supply electric power to the electromagnet such that the electromagnet can generate a magnetic field, and a current controller configured to control the supply of electric power from the power supply unit to the electromagnet.

The test piece fixing unit may include a plate configured to allow the test piece to be placed thereon, and a fixing member configured to fix the test piece to the plate.

The plate may be made of a nonmagnetic material so as not to be affected by the electromagnet.

The plate may be provided in the middle portion thereof with an opening.

The strength of adhesion between the magnetic material and the test piece must be higher than the peel strength of the test piece. Increasing or decreasing the intensity of the electromagnet in order to find the point at which attractive force between the electromagnet and the magnetic material is equal to peel strength is the principle of the apparatus according to the present invention.

The magnetic material may have a sufficient weight to peel the test piece in the case in which the magnetic material is fixed to the lower surface of the test piece. In the case in which attractive force between the electromagnet and the magnetic material becomes lower than peel strength as the result of decreasing the intensity of the electromagnet, peeling occurs, whereby peel strength may be measured.

The magnetic material may be a paramagnetic material or a ferromagnetic material, and the magnetic material may have a shape in which the surface of the magnetic material attached to the surface of the test piece to be peeled is minimized. Specifically, the magnetic material may have the form of a stud, a cylinder, a bead, or an array including a plurality of cylinders connected to each other.

The electromagnet may generate a magnetic field in which lines of magnetic force that reach the magnetic material are substantially a plurality of straight lines parallel to each other.

A method of measuring the peel strength of a test piece using the peel strength measurement apparatus using the electromagnet may include the following steps 1) to 4):

1) finding a correlation between the weight of the magnetic material and current applied to the electromagnet capable of supporting the magnetic material;
2) fixing the test piece to the test piece fixing unit;
3) attaching the magnetic material to a position of the test piece in step 2) at which peel strength of the test piece is to be measured; and
4) adjusting the intensity of current applied to the electromagnet to measure current at which the test piece in step 3) is peeled.

Step 3) may be performed before step 2).

BEST MODE

The present invention relates to a peel strength measurement apparatus using an electromagnet, and the peel strength measurement apparatus includes a test piece fixing unit, a magnetic material, an electromagnet, a power supply unit, and a current controller.

Hereinafter, a peel strength measurement apparatus and a peel strength measurement method according to the present invention will be described in detail.

a) First Method, Second Method, and Third Method

A method of measuring the peel strength of a test piece using the peel strength measurement apparatus using the electromagnet includes:

1) a step of finding a correlation between the weight of the magnetic material and current applied to the electromagnet capable of supporting the magnetic material;
2) a step of fixing the test piece to the test piece fixing unit;
3) a step of attaching the magnetic material to a position of the test piece in step 2) at which the peel strength of the test piece is to be measured; and
4) a step of adjusting the intensity of current applied to the electromagnet to measure current at which the test piece in step 3) is peeled.

Step 3) may be performed before step 2).

Specifically, according to a peel strength measurement method (a first method), a magnetic material is attached to the lower surface of a test piece, the peel strength of which is to be measured, and an electromagnet is disposed at the surface that is opposite the magnetic material based on the test piece (the upper surface of the test piece). As current applied to the electromagnet is adjusted, the test piece is peeled due to the weight of the magnetic material. A current value at the point at which the test piece starts to be peeled is measured, whereby peel strength is measured.

According to another peel strength measurement method (a second method), a magnetic material is attached to the upper surface of a test piece, the peel strength of which is to be measured, and an electromagnet is disposed at the upper surface of the test piece. As current applied to the electromagnet is adjusted, the test piece is peeled by the attractive force of the magnetic material. A current value at the point at which the test piece starts to be peeled is measured, whereby peel strength is measured. At this time, however, the test piece must be supported by a test piece fixing unit in order to prevent the entire test piece from being lifted.

According to yet another peel strength measurement method (a third method), electromagnets may be disposed at the same surface based on a test piece. At this time, magnetic materials are attached to opposite surfaces of the test piece, and an electromagnet is disposed in the vicinity of each of the magnetic materials. When the intensity of each of the electromagnets is increased such that the attractive force between each of the electromagnets and a corresponding one of the magnetic materials is higher than peel strength, the test piece is peeled. At this time, it is possible to measure peel strength from current at which the test piece is peeled.

b) Test Piece

The test piece means a stack including at least two layers that adhere to each other.

As a concrete example, the test piece may be a unit cell configured such that electrodes and a separator are laminated while being alternately stacked, wherein the separator may include a porous substrate having a size larger than the size of each of the electrodes and may be configured to have a structure in which an inorganic coating portion is formed on a region of each surface of the porous substrate that contacts a corresponding one of the electrodes and in which adhesive portions are formed at opposite side regions of the inorganic coating portion that does not contact a corresponding one of the electrodes. Alternatively, the test piece may be an electrode assembly including a plurality of stacked unit cells, the test piece may be a multilayered separator, or any battery part having a multilayered structure may be used as the test piece.

c) Magnetic Material

The magnetic material is a paramagnetic material or a ferromagnetic material.

The paramagnetic material is a material having a very small magnetic field, and examples thereof include aluminum, copper, magnesium, tungsten, platinum, gold, tin, manganese, and an alloy thereof. In the case in which a magnet approaches the paramagnetic material, the paramagnetic material very weakly attracts the magnet. Although a total magnetic field increases, there is little influence, since the magnetic field of the paramagnetic material is very small.

The ferromagnetic material is a magnetic material that exhibits high magnetism and is thus capable of sticking to a magnet, and examples thereof include iron, cobalt, nickel, an alloy thereof, and rare-earth materials such as neodymium and gadolinium. In the case in which a magnet approaches the ferromagnetic material, the ferromagnetic material very strongly attracts the magnet, and therefore total magnetic field increases. Each atom in the ferromagnetic material serves as a magnet. In the state in which no external magnetic field is applied, the atoms in the ferromagnetic material are irregularly arranged, and therefore there is no effect like a magnet as a whole. In the case in which a magnet is brought to the ferromagnetic material from outside, however, the atoms in the ferromagnetic material are arranged toward the external magnetic field, and therefore the ferromagnetic material sticks to the magnet. Metal oxides, such as iron oxide, chromium oxide, and ferrite, may exhibit strong magnetism. A ferromagnetic material in an alloy state is mainly used as a permanent magnet.

Since a material having very low peel strength may be easily peeled even in the case in which current is slightly raised, it is necessary to use the paramagnetic material, and the ferromagnetic material is advantageous in measuring general peel strength.

The magnetic material has a sufficient weight to peel the test piece in the case in which the magnetic material is fixed only to the lower surface of the test piece. This is a condition necessary in the case in which the test piece is peeled using gravity. In the case in which the test piece is peeled using the attractive force between the magnet and the magnetic material, however, the above condition is not needed.

The test piece and the magnetic material are adhered to each other using an adhesive. The kind of the adhesive is not limited. However, the strength of adhesion between the magnetic material and the test piece must be higher than the peel strength of the test piece.

The magnetic material has a shape in which the surface of the magnetic material attached to the surface of the test piece to be peeled is minimized.

The magnetic material has the form of a stud, a cylinder, a bead, or an array including a plurality of cylinders connected to each other.

d) Electromagnet

The electromagnet may generate a magnetic field in which lines of magnetic force that reach the magnetic material are substantially a plurality of straight lines parallel to each other. In the case in which the lines of magnetic force are not parallel lines, force related thereto may be measured in advance. In order to obtain results having high consistency, however, it is preferable that the electromagnet have a wide surface such that a magnetic field having a plurality of straight lines parallel to each other is formed.

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Embodiments of the present invention will be described in detail with reference to the accompanying drawings.

Embodiment 1

Figure 1:
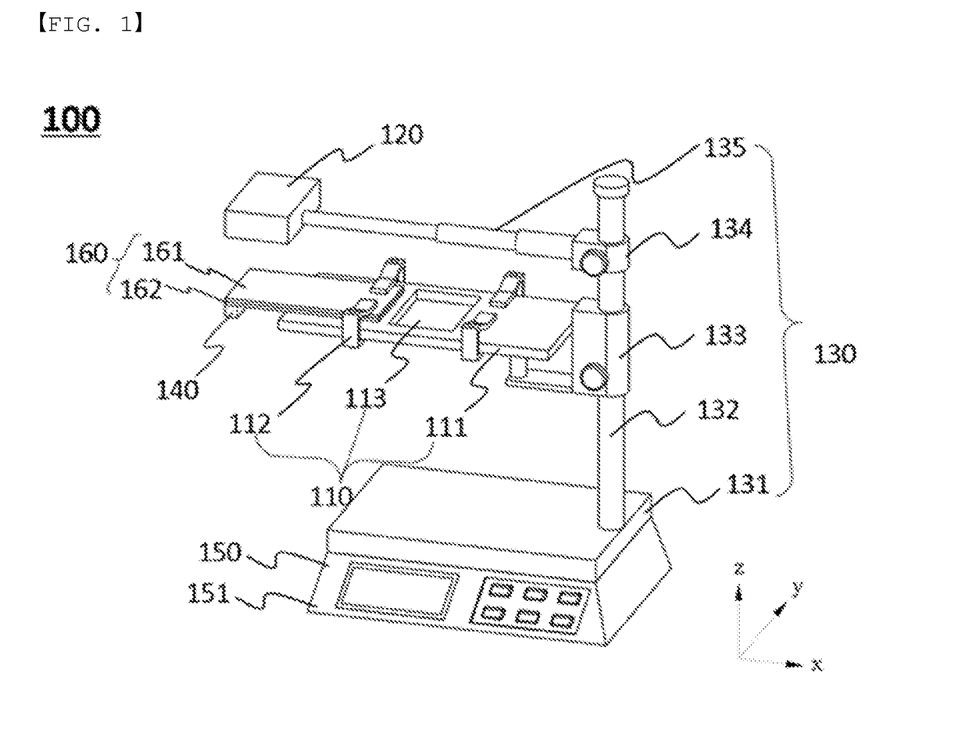
FIG. 1 is a perspective view showing an example of measuring the peel strength of the end portion of a test piece using a peel strength measurement apparatus using an electromagnet according to a first embodiment of the present invention.
Figure 2:
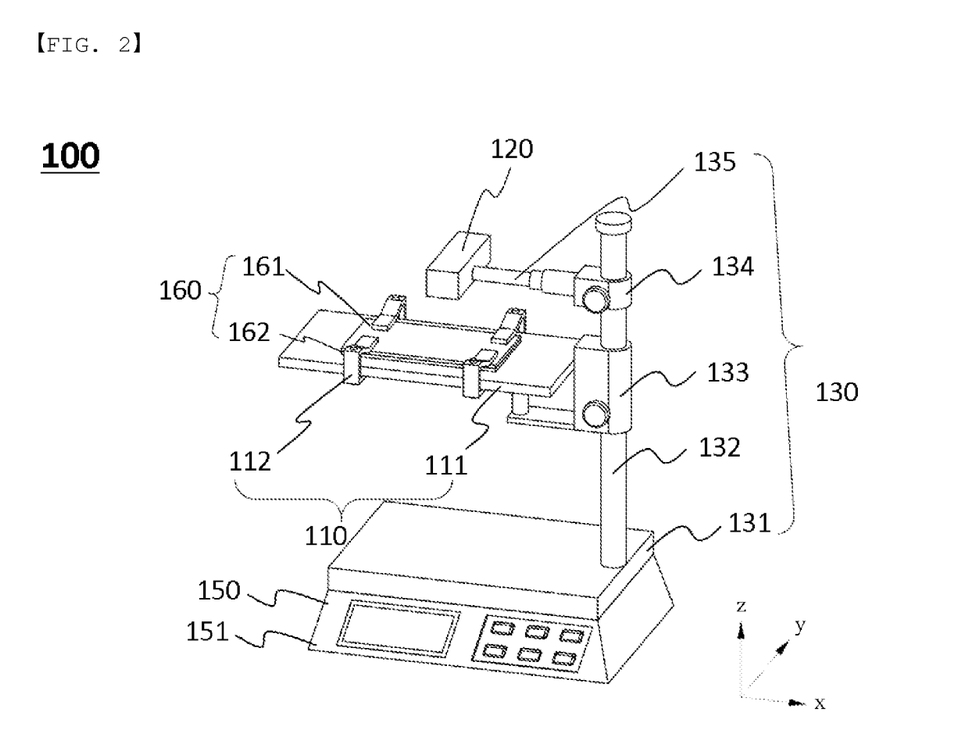
FIG. 2 is a perspective view showing an example of measuring the peel strength of the middle portion of the test piece using the peel strength measurement apparatus using the electromagnet according to the first embodiment of the present invention.

FIGS. 1 and 2 are perspective views showing a peel strength measurement apparatus 100 using an electromagnet according to a first embodiment of the present invention.

Referring to FIGS. 1 and 2, a test piece fixing unit 110 and an electromagnet 120 are fixed to a support unit 130. The support unit includes a base member 131, a vertical frame 132 formed at the base member 131 so as to extend upwards, a first height adjustment member 133 to which the test piece fixing unit 110 is connected so as to be movable upwards and downwards along the vertical frame 132, a second height adjustment member 134 to which the electromagnet 120 is connected so as to be movable upwards and downwards along the vertical frame 132, and a position adjustment member 135 configured to adjust the position of the electromagnet 120.

The test piece fixing unit 110 includes a plate 111 configured to allow a test piece 160 to be placed thereon and a fixing member 112 configured to fix the test piece 160 to the plate 111.

The test piece 160 is a stack including a first layer 161 and a second layer 162.

The plate 111 is connected to the vertical frame 132 at a height at which the plate is spaced apart from the base member 131 by a predetermined distance. The plate 111 is configured to have a structure in which the height of the plate can be adjusted by the first height adjustment member 133 in a z-axis direction.

The plate 111 may be formed in a quadrangular planar structure having a predetermined thickness, and may be formed so as to have a size larger than the size of the test piece 160.

An opening 113 is formed in the middle portion of the plate 111.

The test piece 160 is fixed to the upper surface of the plate 111 by the fixing member 112.

The fixing member 112 is not particularly restricted as long as the fixing member has a structure capable of fixing the test piece 160 to the plate 111, and may be a clip, a clamp, or a pin.

A magnetic material 140 is attached to the lower surface of the test piece 160, i.e. the second layer 162, and the electromagnet 120, which is configured to apply magnetic force to the magnetic material 140, is disposed at the surface that is opposite the magnetic material 140 based on the test piece 160.

The electromagnet 120 is fixed to the vertical frame 132, and is located at a position higher than the position of the plate 111. The electromagnet 120 is configured to have a structure in which the height of the electromagnet can be adjusted along the vertical frame 132 by the second height adjustment member 134 in the z-axis direction.

The second height adjustment member 134 is connected to the electromagnet 120 via the position adjustment member 135.

The electromagnet 120 is connected to a power supply unit 150 configured to supply electric power to the electromagnet 120 such that the electromagnet can generate a magnetic field and to a current controller 151 configured to control the supply of electric power from the power supply unit 150 to the electromagnet 120.

The position of the electromagnet 120 is adjustable in an x-axis direction as the length of the position adjustment member 135 is adjusted, and the electromagnet 120 may be located on the same axis as the magnetic material 140 attached to the test piece 160.

The magnetic material 140 is attached to a portion of the test piece 160 at which the peel strength of the test piece is to be measured, and the electromagnet 120 is disposed adjacent to the magnetic material 140.

Specifically, in the case in which the peel strength of the edge of the test piece 160 is to be measured, the magnetic material 140 is attached to the edge of the test piece 160.

Referring to FIG. 1, one end of the test piece 160 is disposed so as to protrude outwards from the plate 111, and the other end of the test piece 160 is fixed to the plate by the fixing member 112. The magnetic material 140 is attached to the lower surface of the test piece 160 protruding outwards from the plate 111, and the position adjustment member 135 is adjusted in order to align the electromagnet 120 and the magnetic material 140 with each other in the z-axis direction.

In the case in which the peel strength of the middle portion of the test piece 160 is to be measured, the magnetic material 140 is attached to the middle portion of the test piece 160.

Figure 3:
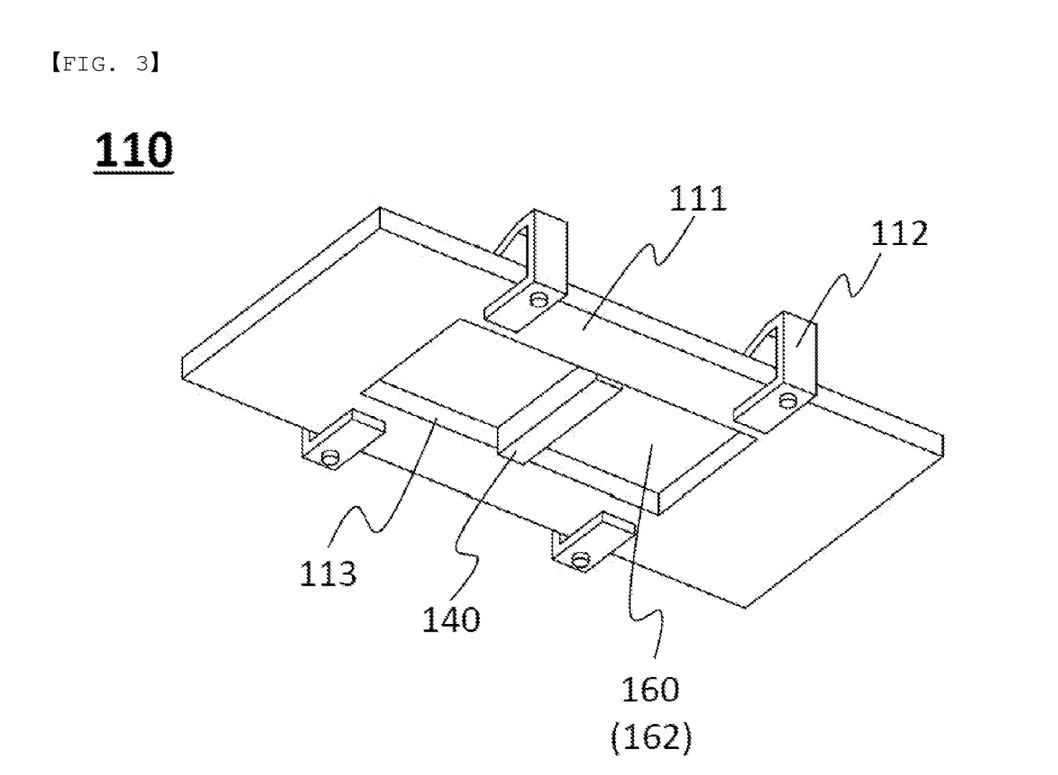
FIG. 3 is a perspective view showing a fixing unit configured to measure the peel strength of the middle portion of the test piece using the peel strength measurement apparatus using the electromagnet according to the first embodiment of the present invention.

Referring to FIGS. 2 and 3, the test piece 160 is disposed at the middle of the plate 111. The test piece 160 is located above the opening 113, and the edge of the test piece 160 is fixed to the plate 111 by the fixing member 112. The magnetic material 140 is attached to the lower surface of the middle portion of the test piece 160.

Figure 4:
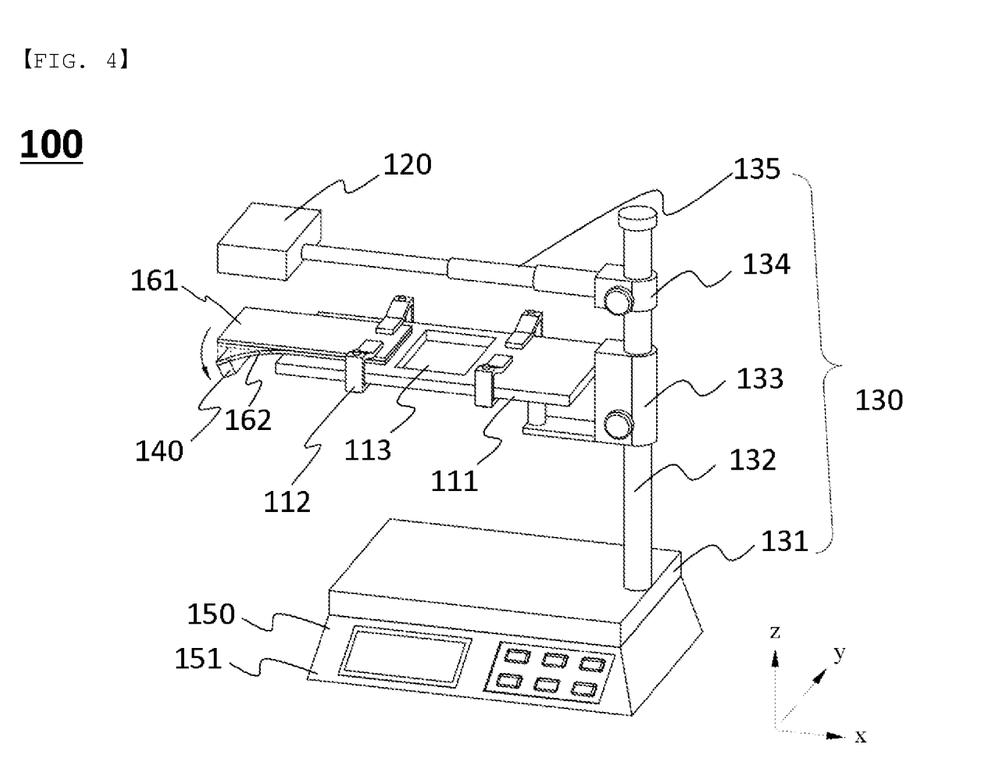
FIG. 4 is a perspective view showing a shape in which the test piece is peeled during measurement of the peel strength of the end portion of the test piece using the peel strength measurement apparatus using the electromagnet according to the first embodiment of the present invention.

FIG. 4 is a perspective view showing a shape in which the test piece is peeled by the peel strength measurement apparatus 100 according to the first embodiment of the present invention.

The magnetic material 140 is attached to the second layer 162 of the test piece, and the electromagnet 120 is located above the magnetic material 140. The position adjustment member 135 is adjusted in order to align the electromagnet 120 with the magnetic material 140 in the z-axis direction.

When current is supplied to the electromagnet 120, force attracting the magnetic material 140 is generated, and therefore the magnetic material 140 may be fixed at a predetermined height by the electromagnet 120.

When the intensity of the current is gradually decreased, the force attracting the magnetic material 140 becomes weak, and therefore the magnetic material 140 moves downwards due to the weight of the magnetic material 140, whereby the test piece 160 is peeled.

A current value at the point at which the test piece starts to be peeled is measured, whereby the peel strength of the test piece 160 is measured.

Unlike what is shown in FIGS. 1 to 4, the magnetic material 140 is attached to the upper surface of the test piece 160, and current applied to the electromagnet is adjusted such that the test piece is peeled by the attractive force of the magnetic material 140. A current value at the point at which the test piece starts to be peeled is measured, whereby peel strength is measured. At this time, however, the test piece must be supported by the test piece fixing unit in order to prevent the entire test piece from being lifted.

Embodiment 2

Figure 5:
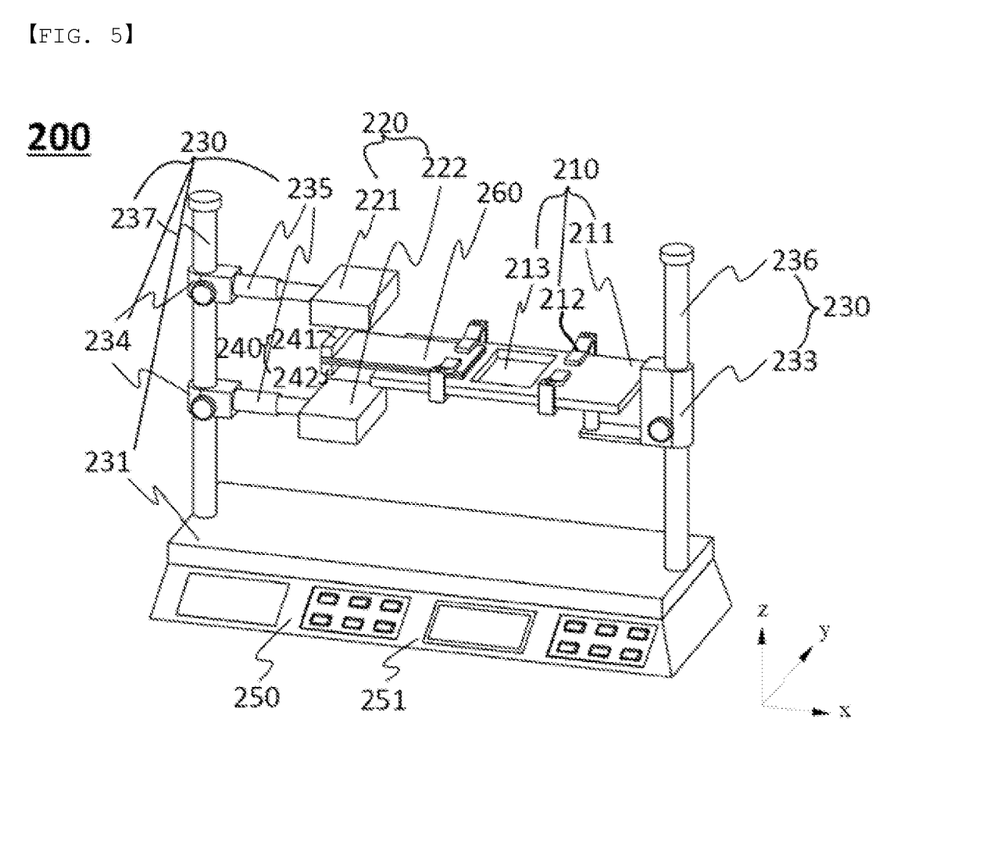
FIG. 5 is a perspective view showing an example of measuring the peel strength of the end portion of a test piece using a peel strength measurement apparatus using an electromagnet according to a second embodiment of the present invention.
Figure 6:
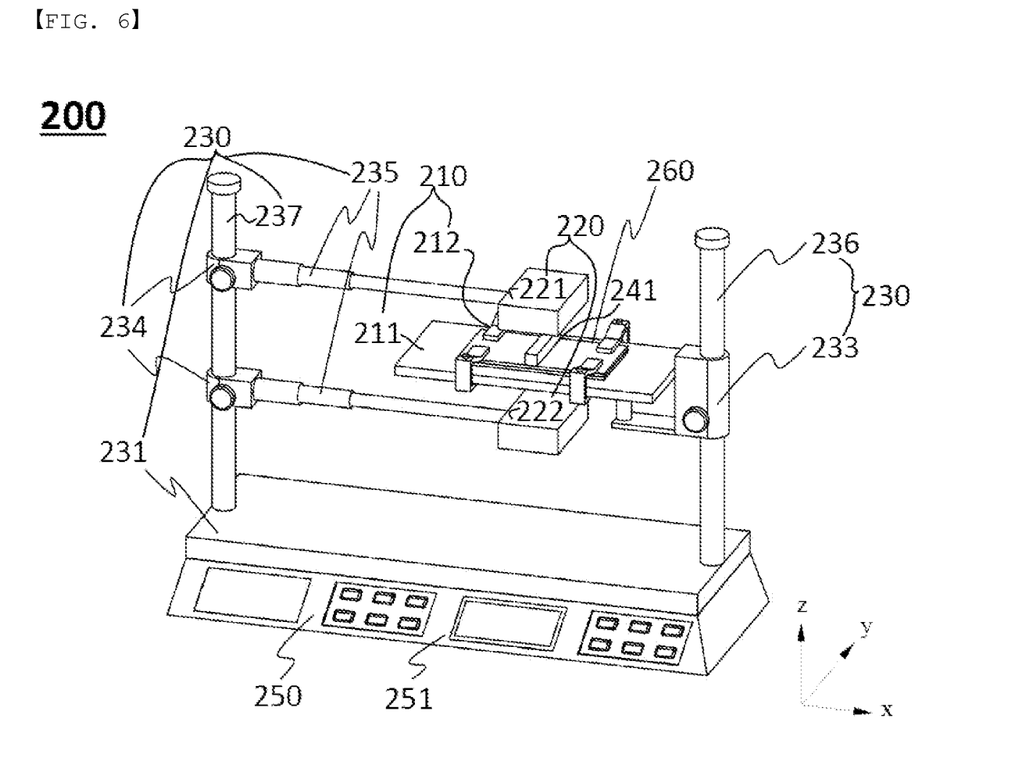
FIG. 6 is a perspective view showing an example of measuring the peel strength of the middle portion of a test piece using the peel strength measurement apparatus using the electromagnet according to the second embodiment of the present invention.

FIGS. 5 and 6 are perspective views showing a peel strength measurement apparatus 200 using an electromagnet according to a second embodiment of the present invention.

Referring to FIGS. 5 and 6, the peel strength measurement apparatus 200 includes a support unit 230, a test piece fixing unit 210, an upper magnetic material 241, a lower magnetic material 242, an upper electromagnet 221, a lower electromagnet 222, a power supply unit 250, and a current controller 251.

The test piece fixing unit 210 and the electromagnets 220 (221 and 222) are fixed to the support unit 230.

The support unit includes a base member 231, a first vertical frame 236 formed at the base member 231 so as to extend upwards, a first height adjustment member 233 to which the test piece fixing unit 210 is fixed so as to be movable upwards and downwards along the first vertical frame 236, a second vertical frame 237 formed at the base member 231 so as to extend upwards, second height adjustment members 234 to which the electromagnets 220 are fixed so as to be movable upwards and downwards along the second vertical frame 237, and position adjustment members 235 configured to adjust the positions of the electromagnets 220.

The first vertical frame 236 is independently disposed on the base member 231 while being spaced apart from the second vertical frame 237 by a predetermined distance.

The test piece fixing unit 210 is connected to the first vertical frame 236 via the first height adjustment member 233, and the electromagnets 220 are connected to the second vertical frame 237 via the second height adjustment members 234.

All of the first height adjustment member 233 and the second height adjustment members 234 are capable of performing height adjustment in the z-axis direction.

The test piece fixing unit 210 includes a plate 211 configured to allow a test piece 260 to be placed thereon and a fixing member 212 configured to fix the test piece 260 to the plate 211, in the same manner as in the first embodiment of the present invention.

The upper electromagnet 221 and the lower electromagnet 222 are disposed above and under the test piece fixing unit 210, respectively.

The upper electromagnet 221 and the lower electromagnet 222 are connected to a power supply unit 250 configured to supply electric power to each of the electromagnets such that each of the electromagnets can generate a magnetic field and to a current controller 251 configured to control the supply of electric power from the power supply unit 250 to each of the electromagnets.

The upper magnetic material 241 is attached to a first layer of the test piece 260 (see 161 of FIG. 1), and the lower magnetic material 242 is attached to a second layer of the test piece 260 (see 162 of FIG. 1).

The magnetic materials 240 are attached to a portion of the test piece 260 at which the peel strength of the test piece is to be measured, and the electromagnets 220 are disposed adjacent to the magnetic materials 240.

Specifically, in the case in which the peel strength of the edge of the test piece is to be measured, the magnetic materials 240 are attached to the edge of the test piece.

Referring to FIG. 5, one end of the test piece 260 is disposed so as to protrude outwards from the plate 211, and the other end of the test piece 260 is fixed to the plate 211 by the fixing member 212. The upper magnetic material 241 is attached to the edge of the upper surface of the test piece 260 protruding outwards from the plate 211, and the lower magnetic material 242 is attached to the edge of the lower surface of the test piece 260.

In the case in which the peel strength of the middle portion of the test piece 260 is to be measured, the magnetic materials 240 are attached to the middle portion of the test piece 260.

Referring to FIG. 6, the test piece 260 is disposed at the middle of the plate 211. The test piece 260 is located above an opening 213 (see FIG. 5), and the edge of the test piece 260 is fixed to the plate 211 by the fixing member 212. The upper magnetic material 241 is attached to the upper surface of the middle portion of the test piece 260, and the lower magnetic material 242 (see FIG. 5) is attached to the lower surface of the middle portion of the test piece 260.

The upper electromagnet 221 is disposed above the upper magnetic material 241, and the lower electromagnet 222 is disposed under the lower magnetic material 242.

For measurement of peel strength, the position adjustment members 235 are adjusted in order to align the electromagnets 220 with the magnetic materials 240 (see FIG. 5) in the z-axis direction.

Uniform current is supplied to the upper electromagnet 221 and the lower electromagnet 222 in order to support the test piece 260 and the magnetic materials 240 (see FIG. 5) parallel to the plate 211.

Subsequently, uniform current is supplied to the upper electromagnet 221 in order to support the upper magnetic material 241 attached to the test piece 260, and the intensity of current that is supplied to the lower electromagnet 222 is gradually increased in order to attract the lower magnetic material 242 (see FIG. 5) toward the lower electromagnet 222, whereby the test piece 260 is peeled.

In contrast, uniform current may be supplied to the lower electromagnet 222 in order to support the lower magnetic material 242 (see FIG. 5), and the intensity of current that is supplied to the upper electromagnet 221 may be gradually increased in order to peel the test piece 260.

In addition, the intensity of current that is supplied to both the upper electromagnet 221 and the lower electromagnet 222 may be increased in order to peel the test piece 260 by 180 degrees.

Finally, a current value at the time at which the test piece 260 has been peeled is measured, whereby the peel strength of the test piece 260 is measured.

COMPARATIVE EXAMPLE

A conventional adhesive force measurement apparatus includes a test table configured to allow a test tape to be attached thereto, a column perpendicularly disposed on the test table, an upward-downward movement member fixed so as to be movable along the column, the upward-downward movement member being configured to move upwards and downwards in a direction parallel to the test table, and a chuck configured to fix the end of the test tape fixed to the bottom surface of the upward-downward movement member.

In the adhesive force measurement apparatus, the chuck moves upwards to perpendicularly peel the test tape in succession as the upward-downward movement member is moved upwards, whereby adhesive force is measured.

At this time, in the case in which the strength of the thin test tape is not sufficient, there is a high possibility of a griping area of the test tape being torn or deformed even before an interfacial peeling phenomenon occurs. In order to accurately measure interfacial peel strength, tests must be repeatedly performed. In addition, the above apparatus and method have a limitation in that only the peeling force of the middle portion of a surface to be measured is measured.

Although the embodiments of the present invention have been described with reference to the accompanying drawings as described above, those skilled in the art to which the present invention pertains will appreciate that various applications and modifications are possible based on the above description without departing from the scope of the present invention.

DESCRIPTION OF REFERENCE NUMERALS 100, 200: Peel strength measurement apparatuses
110, 210: Test piece fixing units
111, 211: Plates
112, 212: Fixing members
113, 213: Openings
120, 220: Electromagnets
221: Upper electromagnet
222: Lower electromagnet
130, 230: Support units 131, 231: Base members
132: Vertical frame
236: First vertical frame
237: Second vertical frame
133, 233: First height adjustment members
134, 234: Second height adjustment members
135, 235: Position adjustment members
140, 240: Magnetic materials
241: Upper magnetic material
242: Lower magnetic material
150, 250: Power supply units
151, 251: Current controllers
160, 260: Test pieces
161: First layers
162: Second layers

INDUSTRIAL APPLICABILITY

As is apparent from the above description, a peel strength measurement apparatus using an electromagnet according to an embodiment of the present invention does not adopt a peel test system through gripping, whereby it is possible to measure peel strength in the state in which damage to a test piece is minimized.

The present invention has an advantage in that a load is directly applied to a portion at which the measurement of peel strength is desired, whereby it is possible to measure peel strength at any position, and this effect overcomes limitations inherent in all conventional apparatuses.

The invention claimed is:

1. A peel strength measurement apparatus using an electromagnet, the peel strength measurement apparatus comprising:
a test piece fixing unit configured to fix a test piece comprising at least two layers;
a magnetic material attached to at least one surface of the test piece;
an electromagnet configured to apply magnetic force to the magnetic material;
a power supply unit configured to supply electric power to the electromagnet such that the electromagnet generates a magnetic field; and
a current controller configured to control supply of electric power from the power supply unit to the electromagnet,
wherein strength of adhesion between the magnetic material and the test piece is higher than peel strength of the test piece.

2. The peel strength measurement apparatus according to claim 1, wherein the test piece fixing unit comprises:
a plate on which the test piece is placed; and
a fixing member configured to fix the test piece to the plate.

3. The peel strength measurement apparatus according to claim 2, wherein the plate includes an opening in a middle portion of the plate.

4. The peel strength measurement apparatus according to claim 1,
wherein the magnetic material has a sufficient weight to peel a bottom layer of the test piece from remaining layer(s) of the test piece when the magnetic material is fixed to a lower surface of the bottom layer of the test piece.

5. The peel strength measurement apparatus according to claim 1, wherein
the magnetic material comprises a paramagnetic material or a ferromagnetic material, and
the magnetic material has a shape in which a surface of the magnetic material attached to a surface of the test piece to be peeled is minimized.

6. The peel strength measurement apparatus according to claim 5, wherein the shape of the magnetic material is of a stud shape, a cylinder shape, a bead shape, or an array comprising a plurality of cylinder shapes connected to each other.

7. The peel strength measurement apparatus according to claim 1, wherein the electromagnet generates a magnetic field in which lines of magnetic force that reach the magnetic material are substantially a plurality of straight lines parallel to each other.

8. A method of measuring peel strength of a test piece by using the peel strength measurement apparatus according to claim 1, wherein the method comprises:
finding a correlation between a weight of the magnetic material and current applied to the electromagnet capable of supporting the magnetic material such that a bottom layer of the test piece does not peel from remaining layer(s) of the test piece;
fixing the test piece to the test piece fixing unit;
attaching the magnetic material to a position of the test piece at which peel strength of the test piece is to be measured; and
adjusting intensity of current applied to the electromagnet to measure current at which the test piece is peeled.

9. The method according to claim 8, wherein the attaching the magnetic material is performed before the fixing the test piece.

* * * * *